May 5, 1959 K. SCHLESINGER 2,885,467

SYNCHRONOUS DETECTING SYSTEM FOR COLOR TELEVISION

Original Filed Aug. 6, 1953 2 Sheets-Sheet 1

INVENTOR
Kurt Schlesinger
BY
Norman L. Mueller

INVENTOR
Kurt Schlesinger
BY
Foorman L. Mueller
Atty.

United States Patent Office 2,885,467

Patented May 5, 1959

2,885,467

SYNCHRONOUS DETECTING SYSTEM FOR COLOR TELEVISION

Kurt Schlesinger, La Grange, Ill., assignor to Motorola, Inc., Chicago, Ill., a corporation of Illinois Continuation of application Serial No. 372,697, August 6, 1953. This application May 28, 1958, Serial No. 738,570

20 Claims. (Cl. 178—5.4)

The present invention relates generally to synchronous detecting systems, and more particularly to an improved demodulating network that may be utilized to recover the modulation products of a selected one of a plurality of amplitude modulated carrier wave components which have the same frequency and different phases in response to an exciting signal which has a predetermined frequency and phase relation with the selected modulated wave component. This application is a continuation of my application Serial No. 372,697, filed August 6, 1953, and now abandoned.

One application of the improved demodulating network of the invention is in the receiver of a color television system in which color or chroma information is transmitted on one or more sub-carrier components, this being the case in the NTSC type of color television system. The NTSC color system is described in an article by C. J. Hirsch et al., entitled "Principles of NTSC Compatible Color Television," at page 88 of Electronics magazine published by McGraw-Hill Corporation in February 1952 edition. In this type of color television system, it is usual to produce a brightness signal representing monochrome information of the televised scene, and color-difference signals representing different color or chroma information. Two of the color-difference signals are respectively modulated on two quadrature sub-carrier components which have the same frequency.

The modulation products of the chroma sub-carrier components referred to above may be recovered in a color television receiver by using a pair of demodulating networks constructed in accordance with the teachings of the present invention. The modulated sub-carrier components are impressed on the demodulating networks and exciting signals respectively having the frequency and phase of a corresponding one of the sub-carrier components are produced at the receiver and impressed on the respective demodulating networks. The demodulating networks are so constructed that each recovers only the modulation products of a corresponding one of the chroma sub-carrier components in response to its exciting signal.

It is, accordingly, an object of the present invention to provide an improved and simplified demodulating circuit capable of selecting and demodulating an ampiltude modulated signal and of recovering its modulation products in response to an exciting signal having the frequency and phase of the selected signal and which is also impressed on the circuit.

Yet another object of the invention is to provide such an improved demodulating circuit that is extremely simple in its construction and which requires few and relatively simple and inexpensive component parts.

Still another object of the invention is to provide such an improved and simplified demodulation circuit that not only selects and demodulates a particular amplitude modulated signal in response to an exciting signal, but also provides amplification for the modulation products so recovered.

An additional object of the invention is to provide such an improved demodulating circuit which is capable of producing, in a simple manner, the modulation products of the modulated signal demodulated thereby in balanced form, this often being desirable in color television receivers.

A feature of the present invention is the provision of an improved demodulating circuit that incorporates half-wave rectifier means to which the exciting signal and a pair of phase quadrature modulated signal components of like frequency are applied, the exciting signal having a predetermined phase and frequency relation with one of the modulated signal components and having greater amplitude. The half-wave rectifier means functions in a simple manner as an envelope detector to recover the modulation products of the modulated signal components with which the exciting signal has the predetermined phase relation.

Another feature of the invention is the provision of such an improved demodulating circuit that incorporates a triode functioning as a grid-controlled half-wave rectifier and to which the modulated signal components and exciting signal are applied so that the modulation products of a particular one of the signal components may be obtained in amplified form.

Yet another feature of the invention is the provision of such an improved demodulating circuit in which the grid-controlled half-wave rectifier is connected so that a balanced output of the recovered modulation products may be obtained in a simple and expedient manner.

The above and other fetaures of the invention which are believed to be new are set forth with particularity in the appended claims. The invention itself, however, together with further objects and advantages thereof, may best be understood by reference to the following description when taken in conjunction with the accompanying drawings in which:

The demodulating circuit of the present invention is intended to recover the modulation products of a modulated carrier wave. This is accomplished in response to an exciting signal having the frequency and phase of the carrier wave and having an amplitude large relative thereto. The circuit comprises a half-wave rectifier means which may, for example, be a diode or a triode circuit means for supplying the modulating carrier wave and the exciting signal to the rectifier means as a composite signal corresponding to the sum of the modulated carrier wave and the exciting signal, and an output circuit coupled to the rectifier means for deriving a signal having an alternating current component corresponding to the modulation products of the carrier.

Figure 1:
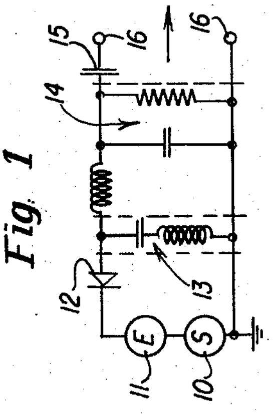
Fig. 1 is a schematic representation of one embodiment of the invention.

The circuit of Fig. 1 includes a first signal source "S" indicated 10 and which represents a source of an amplitude-modulated carrier wave having a selected frequency, and which includes, for example, a pair of quadrature components each modulated with different chroma information. The circuit also includes a second signal source "E" indicated 11, which represents a source of an exciting signal having a selected frequency and phase relation with the modulated wave of source 10. The sources 10 and 11 are connected in series so that together these sources produce a composite signal representing the sum of the amplitude-modulated carrier wave and the exciting signal. One terminal of source 10 is connected to ground and one terminal of source 11 is connected to a half-wave rectifier device 12 which, in this embodiment, may be a diode or a crystal or other suitable half-wave rectifier means. The other electrode of rectifier 12 is coupled to ground through a series-resonant circuit 13 tuned to the frequency of the carrier and exciting signals.

The latter terminal of rectifier 12 is also coupled through a low-pass filter 14 and coupling capacitor 15 to one of the output terminals 16 of the circuit, the other output terminal being connected to ground.

The operation of the circuit of Fig. 1 may best be understood by the following mathematical analysis: Assume that the amplitude-modulated wave S from source 10 represents the two quadrature modulated color sub-carrier components of which one is to be demodulated in the particular circuit. As previously stated, these color sub-carrier components are in phase quadrature, and they have a like frequency which, by present-day standards, is 3.58 megacycles. The first modulated color sub-carrier component may be represented by the expression:

$$(1)\qquad s=\tfrac{1}{2}S(1+m_i\cos\Omega_i t)\cos(\omega t)$$

where:

$m_i$=modulation factor
$\Omega_i$=modulation frequency
$\omega$=sub-carrier frequency and the second sub-carrier component may be represented by the expression:

$$(2)\qquad s=\tfrac{1}{2}S(1+m_q\cos\Omega_q t)\sin(\omega t)$$

where:

$m_q$=modulation factor
$\Omega_q$=modulation frequency

Therefore, the expression for the sub-carrier with the carrier suppressed, that is, the signal developed by source 10, may be set forth as follows:

$$(3)\qquad s=S[m_i\cos\Omega_i t\cos\omega t+m_q\cos\Omega_q t\sin\omega t]$$

Assume that source 11 develops an exciting signal having the frequency of the sub-carrier. This exciting signal may be expressed by:

$$(4)\qquad e=E\cos(\omega t-\phi)$$

where $\phi$ is the phase between the exciting signal and the sub-carrier.

Therefore, the composite signal "A" applied to the half-wave rectifier 12, which constitutes the sum of the modulated color sub-carrier and the exciting signal may be represented as:

$$(5)\qquad a=\cos\omega t[Sm_i\cos\Omega_i t+E\cos\phi]+\sin\omega t[Sm_q\cos\Omega_q t+E\sin\phi]$$

Therefore, the detected envelope of the composite signal as produced by rectifier 12 is:

$$(6)\qquad (A)=\sqrt{Sm_i\cos\Omega_i t+E\cos\phi)^2+(Sm_q\cos\Omega_q t+E\sin\phi)^2}$$
$$=E\sqrt{\left(\frac{Sm_i}{E}\cos\Omega_i t+\cos\phi\right)^2+\left(\frac{Sm_q}{E}\cos\Omega_q t+\sin\phi\right)^2}$$

Now, if the amplitude of the exciting signal is made large relative to the amplitude of the color sub-carrier (for example, at least twice and preferably three times the amplitude of the color sub-carrier) then:

$$(7)\qquad E>>Sm_i \text{ or } Sm_q$$

so that $$\frac{Sm_i}{E}\text{ or }\frac{Sm_q}{E}\ll 1$$

Therefore, for all practical purposes, squared terms or greater may be neglected. Therefore, Equation 6 reduces to:

$$(8)\qquad (A)=E\sqrt{\frac{2Sm_i}{E}\cos\Omega_i t\cos\phi+\frac{2Sm_q}{E}\cos\Omega_q t\sin\phi+1}$$

and the resulting signal may be expressed:

$$(9)\qquad a_{(t)}=Km_i\cos\Omega_i t\cos\phi+Km_q\cos\Omega_q t\sin\phi+E$$

where K is a constant.

Therefore, when the phase $\phi$ between the exciting signal and the sub-carrier is made 90°, the modulation $m_q\cos\Omega_q t$ of one of the sub-carrier components plus a direct current term E is recovered. On the other hand, when the phase $\phi$ between the exciting signal and the sub-carrier is made zero, the modulation $m_i\cos\Omega_i t$ of the other sub-carrier component plus a direct current term E is recovered.

Therefore, by the simple expedient of envelope detection of a composite signal representing the sum of the color sub-carrier and the exciting signal by half-wave rectification, the modulations of either of the sub-carrier components may be recovered. Thus, by the provision of two networks, and the application to the networks of respective phase quadrature exciting signals, the modulations of both the sub-carrier components may be individually recovered.

In Fig. 1, the series-resonant trap circuit 13 bypasses the sub-carrier and exciter frequency to ground, and the modulation products are passed through the filter 14 so that the desired modulation products are obtained across output terminals 16. Trap circuit 13 may be replaced by a simple bypassing capacitor when so desired.

Figure 2:
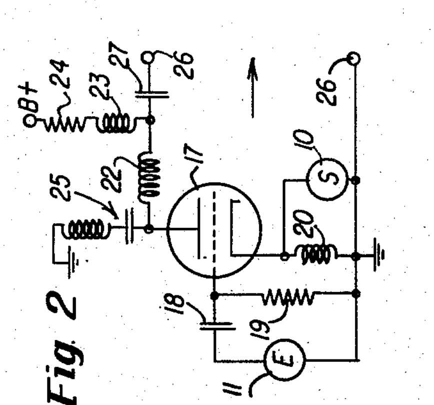
Fig. 2 represents a second embodiment of the invention.

The circuit of Fig. 1 may be modified so that the modulation products of the sub-carrier may be recovered in amplified form. Such a modified circuit is shown in Fig. 2 and includes a triode discharge device 17. The exciting signal source 11 has one terminal connected to ground and the other terminal coupled to the control electrode of device 17 through a coupling capacitor 18, the control electrode being connected to ground through a grid leak resistor 19. The cathode of device 17 is connected to ground through an inductance coil 20, and the sub-carrier signal source 10 has one terminal connected to ground and the other connected to the cathode. The anode of device 17 is coupled to the positive terminal B+ through an inductance coil 22 and through a series-connected choke coil 23 and resistor 24. The anode is bypassed to ground through a series-resonant circuit 25 tuned to the frequency of the sub-carrier signal. The common junction of coils 22 and 23 is coupled to one of the output terminals 26 through a capacitor 27, the other output terminal being connected to ground.

As before, the exciting signal has an amplitude large relative to the modulated sub-carrier components and has the frequency and phase of the particular sub-carrier component from which the modulation products are to be recovered. The capacitor 18 and resistor 19 form a self-biasing network for discharge device 17, and the parameters of these elements are such that the exciting signal from source 11 biases the device 17 to cut off so that the device translates only the positive half cycles of the exciting signal. In this manner, device 17 functions as a grid-controlled half-wave rectifier. It is apparent that other expedients may be used to bias device 17 so that it will function as a half-wave rectifier, but it has been found that the use of the self-biasing network is most advantageous.

The modulated sub-carrier is applied to the cathode and undergoes half-wave rectification together with the exciting signal from source 11. The mathematical analysis developed for the rectifier of Fig. 1 applies equally to the network of Fig. 2 since the exciting signal and modulated sub-carrier are applied to the device as a composite signal representing the sum of these two signals and the composite signal undergoes half-wave rectification by the device.

The amplified demodulation products of one of the sub-carrier components appear, therefore, at the anode of device 17 when the exciting signal has the selected phase relation with the sub-carrier. Series-resonant network 25 presents low impedance to the exciting signal and sub-carrier frequency and bypasses these signals to ground. Elements 22, 23, 24 function as a low pass filter so that only the desired modulation products appear across output terminal 26.

Figure 3:
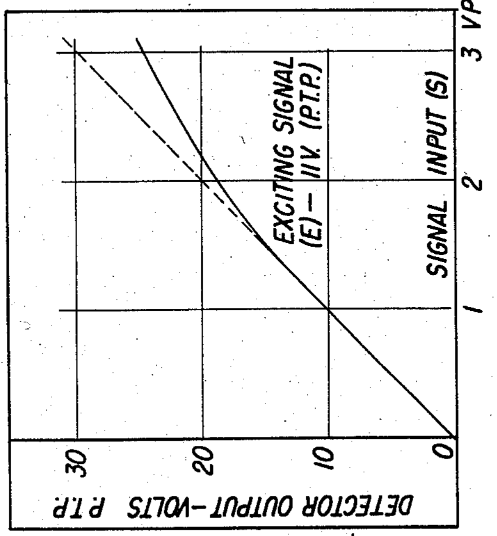
Fig. 3 is a curve indicating the linearity of the circuit of Fig. 2.

The mathematical development of the detector action of the diode or triode is based on the assumption that these devices are linear. It may be shown mathematically that even though the triode device 17 in a usual amplifier circuit exhibits non-linear characteristics to a signal amplified thereby, it exhibits a high degree of linearity in the network of Fig. 2 when the exciting signal has a relatively large amplitude with respect to the sub-carrier. The extreme linearity of circuit Fig. 2 is illustrated in the curve of Fig. 3 which represents the amplitude of the output signal across terminals 26 as compared with the amplitude of the input signal from source 10. It can be seen from that figure, for example, that when the exciting signal from source 11 has a peak-to-peak value of 11 volts, that extreme linearity exists between input and output as the amplitude of the input signal is increased from zero to 1.5 volts. It has been found that for a desired high degree of linearity the amplitude of the exciting signal should be at least three times that of the sub-carrier and preferably more. Due to the inherent linearity of the system of Fig. 2, all cathode degeneration may be avoided, and the cathode may be grounded directly through the inductance coil 20 which may have a small value of the order of 10 microhenries and across which the modulated sub-carrier is induced. In the absence of degeneration, gains of the order of 10 to 12 may be realized.

One type of NTSC system that has been devised has been referred to as the orange-cyan or I–Q type of system in which the two chroma sub-carrier components are modulated in accordance with orange and cyan chroma information. The sub-carrier components are demodulated in the color television receiver to recover the orange and cyan information and this information is converted in a suitable matrix into the usual color difference signals. To simplify the matrix, it is desirable that the detected information from the color sub-carrier components be produced in balanced form with positive and with negative polarity, and this may be achieved by the circuit of Fig. 4.

The exciting signal source 11 is coupled across the primary winding 30 of a transformer 31. The secondary winding 32 of the transformer has one end coupled to the control electrode of an electron discharge device 33 through a coupling capacitor 34, and the secondary has its other end coupled to the control electrode of an electron discharge device 35 through a coupling capacitor 36. The midpoint of secondary winding 32 is connected to ground, and the control electrodes of devices 33 and 35 are connected to ground through respective grid-leak resistors 37 and 38.

The cathodes of devices 33 and 35 are connected together and to ground through a common resistor 39 and the modulated sub-carrier source 10 has one terminal connected to ground and the other terminal coupled to the cathodes through a capacitor 40. The anode of device 33 is connected through an inductance coil 41 and through a series-connected choke coil 42 and resistor 43 to the positive terminal B+, and the anode is coupled to ground through a series-resonant trap 44 tuned to the frequency of the sub-carrier. The common junction of coils 41 and 42 is coupled to one of the output terminals 45 through a capacitor 52, the other output terminal being connected to ground.

The anode of device 35 is connected to the positive terminal B+ through an inductance coil 46 and through a series-connected choke coil 47 and resistor 48. The anode of device 35 is coupled to ground through a series-resonant trap circuit 49 tuned to the frequency of the sub-carrier. The common junction of coils 46 and 47 is coupled to one of the output terminals 50 through a capacitor 51, the other output terminal being connected to ground. As previously, trap circuits 44, 49 may be replaced by simple bypassing capacitors which may be formed by the anode-ground capacity of the discharge devices themselves.

In the latter network, the exciting signal is applied to the control electrodes of devices 33 and 35 in push-pull relation, and the modulated sub-carrier from source 10 is supplied in parallel to the cathodes of these devices. Therefore, the circuits of each of the devices functions in the same manner as the circuit of Fig. 2, with the modulation products recovered by device 34 and developed across output terminals 45 being of positive polarity, whereas the modulation products recovered by device 35, in appearing across output terminals 50, have negative polarity. As stated above, the network of Fig. 4 greatly simplifies the matrices necessary in an orange-cyan type of color television receiver to recover the color difference signals.

Figure 4:
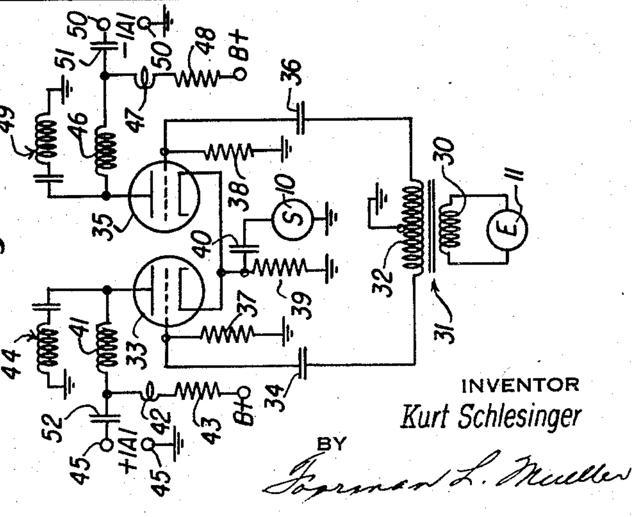

There can be substituted for the circuit of Fig. 4 a double-triode circuit having the exciting signal applied in push-pull to the two separate cathodes, and using the single-ended signal S on the control electrodes in parallel. This circuit offers less loading to the signal S, but requires a slightly more expensive discharge device than the circuit of Fig. 4.

Figure 5:
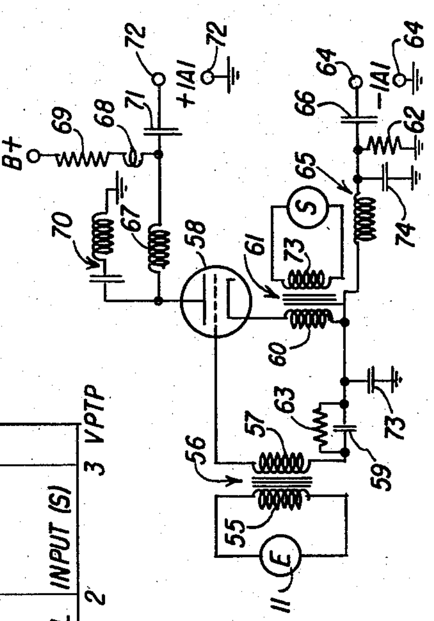
Figs. 4 and 5 show other embodiments of the invention capable of producing a balanced output.

The circuit of Fig. 5 likewise produces the modulation products of the selected sub-carrier component with positive and negative polarity and is a simplified version of the network of Fig. 4 utilizing but a single triode discharge device.

In the circuit of Fig. 5, the exciting signal source 11 is coupled to the primary winding 55 of a transformer 56, and the secondary winding 57 of the transformer has one end connected to the control electrode of a triode electron discharge device 58. The other end of winding 57 is coupled to the cathode of device 58 through a coupling capacitor 59 shunted by a grid leak resistor 63 and through the secondary winding 60 of a transformer 61. The common junction of resistor 63 and winding 60 is coupled to ground through a capacitor 73, and this junction is coupled to one of the output terminals 64 through a filter network including an inductance coil 65 and a capacitor 66. The junction of coil 65 and capacitor 66 is connected to ground through a terminating resistor 62 shunted by a capacitor 74, and the other output terminal 64 is connected directly to ground.

The anode of device 58 is connected to the positive terminal B+ through an inductance coil 67 and through a series-connected choke coil 68 and resistor 69. The anode is coupled to ground through a series-resonant circuit 70 which is tuned to and bypasses the sub-carrier frequency. The common junction of coils 67 and 68 is coupled through a coupling capacitor 71 to one of the output terminals 72, the other output terminal being connected to ground.

As in the previous embodiments, the exciting signal from source 11 biases device 58 to cut off through the self-biasing network formed by capacitor 59 and resistor 63, so that device 58 functions as a grid-controlled half-wave rectifier. The modulated sub-carrier from source 10 is supplied to the cathode of device 58 through the primary winding 73 of transformer 61, and as before, the amplified modulation products of the selected sub-carrier component are recovered at the anode of device 58 and appear across terminals 72, for example, with positive polarity. These amplified modulation components also appear across terminating resistor 62 and, therefore, across output terminal 64 with the opposite polarity to those appearing across output terminals 72.

In the circuit of Fig. 5, capacitor 73 between the cathode of device 58 and ground is the determining factor for the amplitude of the signals available across terminals 64. If the value of this capacitor is too large, resistor 62 (which forms a terminating impedance for the $\pi$-network formed by inductance coil 65 and capacitors 73 and 74) must have a value that is too small to derive any appreciable signal amplitude across terminals 64. On the other hand, if the value of capacitor 73 is too small, no signal voltages are built up in full across the control electrode and cathode of device 58. Therefore, capacitor 73 must be given a compromise value to provide signals across terminals 64 having a selected amplitude relation with the same signals of opposite phase developed across terminals 72.

In a constructed embodiment of the circuit of Fig. 5, the following parameters were used and are listed herein merely as an illustrative example of the invention without any intention to limit the invention in any way:

| | | |
|---|---|---|
| Resistor 69 | kilohms | 8.2 |
| Coil 68 | millihenries | 1 |
| Coil 67 | do | 2 |
| Capacitor 59 | microfarads | 0.1 |
| Resistor 63 | megohms | 1 |
| Capacitor 73 | micromicrofarads | 50 |
| Coil 65 | millihenries | 0.5 |
| Capacitor 74 | micromicrofarads | 25 |
| Resistor 62 | kilohms | 3.8 |

With the above parameters, the amplitude of the signal derived across terminals 64 is 40 percent of that obtained across terminals 72. This provides the desired proportion for present-day NTSC systems, however, as any desired amplitude relation can be established by varying the parameters of the anode circuit of device 58.

Care must be taken in designing transformers 56 and 61 since the effect of capacitor 73 can be nullified by the existence of excess capacity between windings 57 or 60 and ground.

Figure 6:
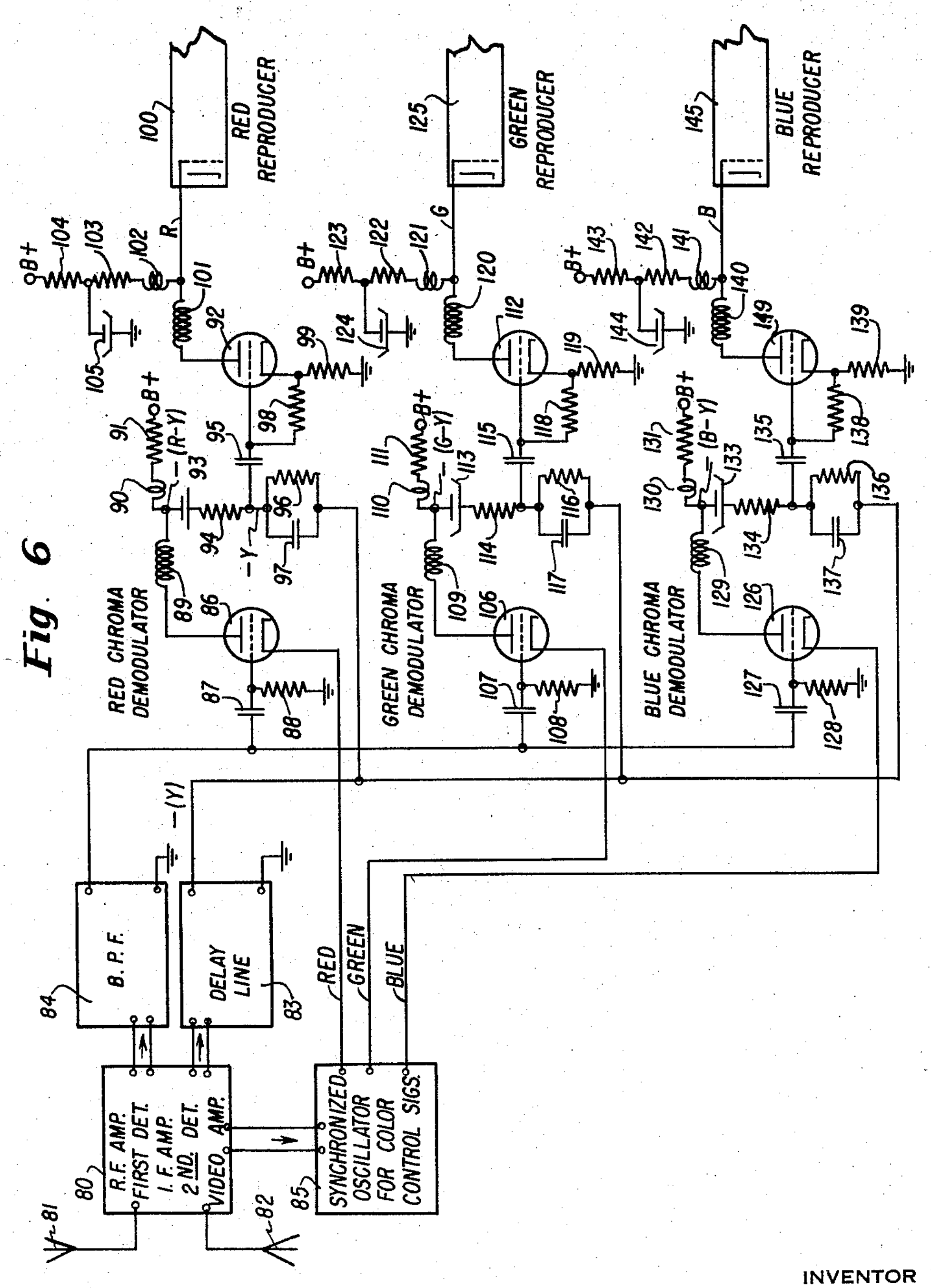
Fig. 6 represents a color television receiver incorporating an embodiment of the invention.

The color television receiver of Fig. 6 is intended to operate in an NTSC type of color television system referred to previously herein in which the red and blue chroma information is modulated on a pair of color sub-carrier components of like frequency but in phase quadrature.

The color television receiver includes a unit 80 which incorporates the usual radio frequency amplifier, first detector, intermediate frequency amplifier, second detector, and video amplifier stages of the color television receiver. These stages are cascade connected in well-known manner and a detailed description of such stages is deemed to be unnecessary in this specification. The input terminals of unit 80 are connected to an appropriate antenna 81, 82, and one pair of output terminals of the unit is connected to a delay line 83. Another pair of output terminals is connected to a bandpass filter 84, and yet another pair of output terminals is connected to a synchronized oscillator 85.

The receiver includes a red chroma demodulator which, in turn, includes a triode electron discharge device 86. One of the output terminals of filter 84 is coupled to the control electrode of device 86 through a coupling capacitor 87, the control electrode being connected to ground through a grid-leak resistor 88. The other output terminal of filter 84 is connected to ground.

The cathode of discharge device 86 is connected to one of the output terminals of the synchronizing oscillator 85. The anode of device 86 is connected to the positive terminal B+ through an inductance coil 89 and through a series-connected choke coil 90 and resistor 91. The common junction of coils 89 and 90 is coupled to the control electrode of a triode amplifier device 92 through a capacitor 93, a resistor 94, and a further capacitor 95. The common junction of resistor 94 and capacitor 95 is connected to one of the output terminals of delay line 83 through a resistor 96, the resistor being shunted by a capacitor 97 and the other output terminal of delay line 83 being connected to ground.

The control electrode of amplifier 92 is connected to the cathode through a grid-leak resistor 98, and the cathode is connected to ground through a resistor 99. The anode of device 92 is connected to the control electrode of a cathode-ray image reproducer 100 through an inductance coil 101, the junction of coil 101 and the control electrode of device 100 being connected to the positive terminal B+ through a choke coil 102 and a pair of series-connected resistors 103 and 104, and the junction of resistors 103 and 104 being bypassed to ground through a decoupling capacitor 105.

The ungrounded terminal of bandpass filter 84 is also coupled to the control electrode of a triode electron discharge device 106 through a coupling capacitor 107, the control electrode being connected to ground through a grid-leak resistor 108. The cathode of device 106 is connected to another output terminal of synchronized oscillator 85, and the anode of the device is connected to the positive terminal B+ through an inductance coil 109 and through a series-connected choke coil 110 and resistor 111. The junction of coils 109 and 110 is coupled on the control electrode of a triode amplifier 112 through a capacitor 113, a resistor 114, and a capacitor 115. The junction of resistor 114 and capacitor 115 is connected to the ungrounded terminal of delay line 83 through a resistor 116 shunted by a capacitor 117.

The control electrode of device 112 is connected to the cathode through a resistor 118, and the cathode is connected to ground through a resistor 119. The anode of device 112 is connected to the positive terminal B+ through an inductance coil 120 and through a choke coil 121, a resistor 122, and a resistor 123. The junction of resistors 122 and 123 is bypassed to ground through a decoupling capacitor 124, and the junction between coils 120 and 121 is connected to the control electrode of a cathode-ray image reproducing device 125.

The ungrounded output terminal of bandpass filter 84 is also coupled to the control electrode of an electron discharge device 126 through a coupling capacitor 127, the control electrode being connected to ground through a grid-leak resistor 128. The cathode of device 126 is connected to one of the output terminals of synchronized oscillator 85, and the anode of the device is connected to the positive terminal B+ through an inductance coil 129, and through a choke coil 130 and resistor 131. The junction of coils 129 and 130 is coupled to the control electrode of a triode amplifier device 149 through a capacitor 133 and series-connected resistor 134 and capacitor 135. The junction of resistor 134 and capacitor 135 is connected to the ungrounded output terminal of delay line 83 through a resistor 136 shunted by a capacitor 137.

The control electrode of device 149 is connected to the cathode through a resistor 138 and the cathode is connected to ground through a resistor 139. The anode of the device is connected to the positive terminal B+ through an inductance coil 140 and through series-connected choke coil 141, resistor 142, and resistor 143. The junction of resistors 142 and 143 is bypassed to ground through a decoupling capacitor 144, and the junction of coils 140 and 141 is connected to the control electrode of a cathode ray image reproducing device 145.

Triode 86 functions as the red chroma demodulator and the modulation products recovered thereby are amplified by device 92 and supplied to reproducing device 100 which reproduces the red colors of the televised scene. Device 126, on the other hand, recovers the blue chroma modulation components which are amplified by device 149 and supplied to reproducing device 145 which reproduces the blue colors of the televised scene. Similarly, the green chroma information is recovered by device 106 amplified by device 112 and supplied to reproducer 125 which reproduces the green color components of the televised scene. The reproducing devices 100, 125 and 145 are usually combined within a single envelope within which each reproducer functions to reproduce its particular color.

When the receiver is tuned to a color television signal of the NTSC type, such a signal is amplified and detected in unit 80. The monochrome or brightness component of the color television signal is supplied to delay line 83 and is designated the (*y*) component. Delay line 83 may be of any known construction and its purpose is to delay the brightness component an amount equal to the delays suffered by the chroma components as they are translated through the decoder section of the receiver. In this manner the proper time relation between the brightness component and the chroma components is established as these components are applied to the image reproducers. As previously pointed out, the color television signal also includes a pair of sub-carrier components of like frequency and in phase quadrature and modulated respectively by the blue and red chroma information. These sub-carrier components are selected by the bandpass filter 84 (which is of any known construction) and supplied to the control electrodes of triodes 86, 106 and 126 through the networks 87, 88; 107, 108; and 127, 128 these networks functioning as self-biasing circuits as previously described.

The NTSC color television signal includes bursts of a reference signal having the frequency and phase of the blue sub-carrier component, these reference bursts being impressed on the line blanking pulses immediately following the corresponding line synchronism pulses.

The reference bursts are selected from unit 80 by the synchronized oscillator unit 85, and they are utilized to synchronize an oscillator in the unit. The oscillator includes an output circuit that produces three distinct exciting signals. The construction of synchronized oscillator unit 85 is known, and any such known type of construction may be used.

One of the exciting signals referred to above has the frequency and phase of the red sub-carrier component, and that exciting signal is supplied to the cathode of triode 86. In the previously described manner, triode 86 is biased by the chroma sub-carrier through self-biasing network 87, 88 so that it functions as a grid-controlled half-wave rectifier and the demodulation products of the red sub-carrier component are developed in the anode circuit of the triode in amplified form. The red modulation products are recovered in device 86 to the exclusion of the blue components since the exciting signal applied to the device has the frequency and phase of the red sub-carrier component and is in phase quadrature with the blue sub-carrier component.

The device 86 produces, therefore, amplified red chroma information in the form of a color difference signnal (*r*—*y*) in its anode circuit. The arrangement is such that the (*r*—*y*) signal appears with negative polarity. The brightness signal derived from delay line 83 also has negative polarity and is mixed with the (*r*—*y*) signal as applied to the control electrode of amplifier 92. In this manner, the signal applied to the control electrode of the amplifier 92 corresponds to the (—*r*) chroma signal so that the (+*r*) chroma signal is produced at the anode of the amplifier and supplied to the control electrode of red reproducer 100.

The synchronized oscillator 85 also produces an exciting signal having the frequency and phase of the blue chroma sub-carrier component and this exciting signal is supplied to the cathode of triode 126. Triode 126, therefore, produces only the modulation components of the blue sub-carrier component, and recovers the (*b*—*y*) color difference signal in amplified form with negative polarity in its anode circuit. The blue color difference signal is mixed with the brightness signal (—*y*) from delay line 83 and applied to control electrode of amplifier 149 so that the amplifier develops the blue color signal in its anode circuit which is applied to the blue reproducer 145.

The synchronized oscillator 85 also develops a third exciting signal having the frequency of the color sub-carrier and having a phase intermediate the phase of the blue and red color sub-carrier components, and this exciting signal is supplied to the cathode of device 106. The blue and red color sub-carrier components are supplied to the control electrode of device 106 and the phase relation between the sub-carrier components and the exciting signal is such that the device 106 develops at its anode circuit blue and red modulation products in the proper proportion to provide the green color difference signal (*g*—*y*) in amplified form and with negative polarity in anode circuit. The technique of recovering the (*g*—*y*) color difference signal from the modulation products of the red and blue sub-carrier components so as to obviate the need for transmitting the green chroma information is well known to the art. The green color difference signal from device 106 is mixed with the brightness signal from delay line 83 and the resulting green signal appears in amplified form in the anode circuit of device 112 and is supplied to the control electrode of the green reproducer 125.

It is to be noted that the entire chroma decoder portion of the television receiver may consist of merely three double triodes, and that in each instance the chroma information is recovered in amplified form and again amplified in a nondegenerative amplifier so that these components may be supplied highly amplified to their respective reproducers with a minimum of circuit components.

The invention provides, therefore, an extremely simple demodulating system for a color television receiver whereby the chroma information of the various sub-carrier components of the color television signal is recovered in an efficient and expeditious manner and in a relatively simple circuit incorporating a minimum of stages.

While a particular embodiment of the invention has been shown and described, modifications may be made and it is intended in the appended claims to cover all such modifications as fall within the true spirit and scope of the invention.

I claim:

1. In a color television receiver for utilizing a color television signal having at least one color sub-carrier component amplitude modulated in accordance with chroma information, the combination of a first source for deriving the color sub-carrier component, a second source for producing an exciting signal having the frequency and phase of the sub-carrier component and at least double the amplitude thereof, an electron discharge device having an anode, a cathode and a control electrode, means for coupling said control electrode to one of said sources, means for coupling said cathode to the other of said souces, an output circuit coupled to said anode and including means for supplying a unidirection energizing potential to said anode, and means for biasing said discharge device to a point whereby said device functions as a half-wave rectifier for the exciting signal and sub-carrier, whereby said output circuit derives a signal having an alternating current component corresponding to the modulation of the sub-carrier component.

2. In a color television receiver, the combination of a first source for producing a pair of color sub-carrier components of like frequency and in phase quadrature and individually amplitude modulated by chroma information; a second source for producing an exciting signal having the frequency and phase of one of the sub-carrier components and having an amplitude at least four times that of the sub-carrier components, an electron discharge device having an anode, a cathode, and a control electrode, self biasing means for biasing said discharge device to a point whereby said device functions as a half-wave rectifier to signals applied thereto, means for coupling said control electrode to one of said sources, means for coupling said cathode to the other of said sources, and an output circuit coupled to said anode for deriving a signal having a direct current component corresponding to the amplitude of the exciting signal and having an alternating current component corresponding to the modulation of said one sub-carrier component in phase with the exciting signal.

3. In a color television receiver, the combination of a first source for producing a pair of color sub-carrier components of like frequency and in phase quadrature and individually amplitude modulated by chroma information, a second source for producing an exciting signal having the frequency and phase of one of the sub-carrier components, a triode electron discharge device having an anode, a cathode and a control electrode, means for coupling said control electrode to said second source, a self biasing network included in said coupling means for biasing said triode to a point whereby said triode functions as a half-wave rectifier to signals applied thereto, means for coupling said cathode to said first source, and an output circuit coupled to said anode for deriving a signal having a direct current component corresponding to the amplitude of the exciting signal and having an alternating current component corresponding to the modulation of said one sub-carrier component in phase with the exciting signal.

4. In a color television receiver, the combination of a first source for producing a pair of color sub-carrier components of like frequency and in phase quadrature and individually amplitude modulated by chroma information, a second source for producing an exciting signal having the frequency and phase of one of the sub-carrier components, an electron discharge device having an anode, a cathode and a control electrode, means for biasing said device to a point whereby said device functions as a half-wave rectifier to signals applied thereto, means for coupling said control electrode to one of said sources, means for coupling said cathode to the other of said sources, and a pair of output circuits respectively coupled to said anode and cathode for deriving a pair of signals of opposite polarity each having a direct current component corresponding to the amplitude of the exciting signal and each having an alternating current component corresponding to the modulation of said one sub-carrier components in phase with the exciting signal.

5. In a color television receiver, the combination of a first source for producing a pair of color sub-carrier components of like frequency and in phase quadrature and individually amplitude modulated by chroma information, a second source for producing an exciting signal having the frequency and phase of one of the sub-carrier components, a pair of electron discharge devices each having an anode, a cathode and a control electrode, circuit means including self-biasing means coupled to said devices for biasing the same to a point whereby said devices function as half-wave rectifiers to signals applied thereto, said circuit means coupling said control electrodes to said second source to supply opposite phase components of the exciting signal to the respective control electrodes, said circuit means also coupling said cathodes to said first source to supply the modulated sub-carrier components to said cathodes, and a pair of output circuits each coupled to a different one of said anodes for deriving a pair of signals of opposite polarity each having a direct current component corresponding to the amplitude of the exciting signal and each having an alternating current component corresponding to the modulation of said one sub-carrier component in phase with the exciting signal.

6. In a color television receiver for utilizing a color television signal having at least one color sub-carrier component amplitude modulated in accordance with chroma information, the combination of a first source for deriving the color sub-carrier component; a second source for producing an exciting signal having the frequency and phase of the sub-carrier component and at least double the amplitude thereof; an electron discharge device having a cathode coupled to one of said sources, having a control electrode coupled to the other of said sources, and having an anode; means for biasing said discharge device to a point whereby said device functions as a half-wave rectifier for the exciting signal; and an output circuit coupled to said anode for deriving a signal having an alternating current component corresponding to the modulation of the sub-carrier.

7. In a color television receiver for utilizing a color television signal having a pair of color sub-carrier components of like frequency and in phase quadrature and individually amplitude modulated with chroma information, said color television signal further including bursts of a reference signal having the frequency of the sub-carrier components and in phase quadrature with one of the sub-carrier components, the combination of a first network for receiving and demodulating the color television signal to derive the modulated sub-carrier components; a second network for selecting the reference bursts and for producing in response thereto an exciting signal having the frequency and phase of one of the sub-carrier components and having an amplitude at least triple the amplitude of the derived sub-carrier components; an electron discharge device having a cathode coupled to one of said networks, having a control electrode coupled to the other of said networks, and having an anode; means for biasing said discharge device to a point whereby said device functions as a half-wave rectifier for the exciting signal; and an output circuit coupled to said anode for deriving a signal having an alternating current component corresponding to the modulation of said one of the sub-carrier components having the phase of said exciting signal.

8. In a color television receiver for utilizing a color television signal having at least one color sub-carrier component amplitude modulated in accordance with chroma information, the combination of a first source for deriving the color sub-carrier component; a second source for producing an exciting signal having the phase and frequency of the sub-carrier component and at least double the amplitude thereof; an electron discharge device having an anode, a cathode and a control electrode; first circuit means coupling said cathode to a point of reference potential; second circuit means coupling said control electrode to said point of reference potential; means for coupling one of said sources across said first circuit means; means for coupling the other of said sources across said second circuit means; biasing means included in one of said circuit means for biasing said discharge device to a point whereby said device functions as a half-wave rectifier for the exciting signal; and an output circuit coupled to said anode for deriving a signal having an alternating current component corresponding to the modulation of the sub-carrier.

9. In a color television receiver for utilizing a color television signal having at least one color sub-carrier component amplitude modulated in accordance with chroma information, the combination of a first source for deriving the color sub-carrier component; a second source for producing an exciting signal having the frequency and phase of the sub-carrier component; an electron discharge device having a control grid coupled to one of said sources, and said discharge device further having an anode electrode and a cathode electrode with one of said electrodes being coupled to the other of said sources; self-biasing means for causing said discharge device to be biased to a point at which said device functions as a grid-controlled rectifier; and an output circuit for deriving from said anode electrode a signal having an alternating current component corresponding to the modulation of the sub-carrier component.

10. In a color television receiver for utilizing a color television signal having a pair of color sub-carrier components of like frequency and in phase quadrature and individually amplitude modulated with chroma information, said color television signal further including bursts of a reference signal having the frequency of the sub-carrier components and in phase quadrature with one of the sub-carrier components, the combination of a first network for selecting the reference bursts and for producing in response thereto an exciting signal having the frequency and phase of one of the sub-carrier components; a second network for receiving and demodulating the color television signal to derive the modulated sub-carrier components; an electron discharge device having a control grid coupled to said first network, and said discharge device further having a cathode electrode and an anode electrode with one of said electrodes being coupled to said second network; self-biasing means for causing said discharge device to be biased to a point at which said device operates as a grid-controlled rectifier; and an output circuit for deriving from said anode electrode a signal having an alternating current component corresponding to the modulation of said one of said sub-carrier components having the phase of said exciting signal.

11. In a color television receiver for utilizing a color television signal having a chroma sub-carrier modulated with chroma information, said color television signal further including bursts of a reference signal having the frequency of the chroma sub-carrier, the combination of a first network for selecting the reference bursts and for producing in response thereto an exciting signal having the frequency of the chroma sub-carrier; a second network for receiving and demodulating the color television signal and including a band-pass filter for deriving the chroma sub-carrier; an electron discharge device having a control grid coupled to said first network, and said discharge device further having a cathode electrode and an anode electrode with one of said electrodes being coupled to said band-pass filter; self-biasing means for causing said discharge device to be biased to a point at which said device operates as a grid-controlled rectifier; a first output circuit for deriving from said anode electrode a signal having an alternating current component corresponding to modulation components of said chroma sub-carrier; and a second output circuit for deriving from said cathode electrode a further signal having an alternating current component corresponding to modulation components of said chroma sub-carrier.

12. In a color television receiver for utilizing a color television signal having a pair of color sub-carrier components of like frequency and in phase quadrature and individually amplitude modulated with chroma information, said color television signal further including bursts of a reference signal having the frequency of the sub-carrier components and in phase quadrature with one of the sub-carrier components, the combination of a first network for selecting the reference signal bursts and for producing in response thereto an exciting signal having the frequency and phase of one of the sub-carrier components; a second network for receiving and demodulating the color television signal and including a band-pass filter for deriving the modulated sub-carrier components; an electron discharge device having a control grid coupled to said first network, and said discharge device further having a cathode electrode and an anode electrode with one of said electrodes being coupled to said second network; means for causing said discharge device to be biased to a point at which said device operates as a grid-controlled rectifier; a first output circuit for deriving from said anode electrode an output signal having an alternating current component corresponding to the modulation of said one of said sub-carrier components having the phase of said exciting signal; and a second output circuit for deriving a further output signal from said cathode electrode.

13. In a color television receiver for utilizing a color television signal having a chroma sub-carrier modulated with chroma information, the combination of a first network for deriving the chroma sub-carrier; a second network for producing an exciting signal having the frequency of the sub-carrier and a selected phase relation with respect thereto; a unilaterally conductive device having an anode electrode, a control electrode and a cathode electrode; circuit means for connecting said control electrode to said first network and for connecting said cathode electrode to said second network to supply a composite signal to said device corresponding to the sum of the chroma sub-carrier and the exciting signal and with the exciting signal having an effective amplitude of at least double the sub-carrier, means connected to one of said electrodes for biasing said device to a rectifying condition for said composite signal, and an output circuit coupled to said anode electrode of said device for deriving a signal having an alternating-current component corresponding to modulation of the chroma sub-carrier.

14. In a color television receiver for utilizing a color television signal having a chroma sub-carrier modulated with chroma information, the combination of a first network for deriving the chroma sub-carrier; a second network for producing an exciting signal having the frequency of the sub-carrier and a selected phase relation with respect thereto; a unilaterally conductive device having an anode electrode, a control electrode and a cathode electrode; circuit means for connecting said control electrode to said first network and for connecting said cathode electrode to said second network to supply a composite signal to said device corresponding to the sum of the chroma sub-carrier and the exciting signal, self-biasing means connected to said control electrode for biasing said device to a half-wave rectifying condition for said composite signal, and an output circuit coupled to said anode electrode for deriving a signal having an alternating-current component corresponding to modulation of the chroma sub-carrier.

15. In a color television receiver for utilizing a color television signal having at least one color sub-carrier component amplitude modulated in accordance with chroma information, the combination of means including a first network for deriving the color sub-carrier component; means including a second network for producing an exciting signal having the frequency and phase of the sub-carrier component; a triode electron discharge device having a control grid coupled to one of said networks, and said discharge device further having an anode electrode and a cathode electrode with one of said electrodes being coupled to the other of said networks; means including said networks whereby said device produces a composite signal corresponding to the sum of the modulated sub-carrier component and the exciting signal with the exciting signal having an effective amplitude at least double that of the subcarrier component, self-biasing means coupled to said control grid for causing said discharge device to be biased to a point at which said device functions as a grid-controlled rectifier for said composite signal, and an output circuit for deriving from said anode electrode a signal having an alternating current component corresponding to the modulation of the sub-carrier component.

16. In a color television receiver for utilizing a color television wave including a chroma subcarrier wave formed of a first subcarrier component amplitude modulated in accordance with selected color information and a second subcarrier component amplitude modulated in accordance with different color information, with said first and second subcarrier components having the same frequency and being in phase quadrature; a system for deriving the modulation from said first and second subcarrier components including in combination, means including a first network for deriving the chroma subcarrier wave, means including a second network for producing first and second exciting signals having the frequency of the subcarrier wave and being in phase with the first and second components of the subcarrier wave, first and second unilaterally conducting devices each having an anode electrode, a control electrode and a cathode electrode, said first network including circuit means connected to said control electrodes of said first and second devices for applying the chroma subcarrier wave thereto, said second network applying said first and second exciting signals to said cathode electrodes of said first and second devices respectively, means whereby a composite signal is developed in each device corresponding to the sum of the chroma subcarrier wave and the exciting signal applied thereto, said circuit means including self-biasing means for biasing each of said devices to a halfwave rectifying condition for said composite signal, and output circuit means including portions coupled to said anode electrodes of said devices for deriving therefrom first and second signals having alternating current components corresponding to the modulation of said first and second subcarrier components.

17. In a color television receiver for utilizing a color television wave including a chroma subcarrier wave formed of a first subcarrier component amplitude modulated in accordance with selected color information and a second subcarrier component amplitude modulated in accordance with different color information, with said first and second subcarrier components having the same frequency and differing in phase by a predetermined amount; a system for deriving the modulation from said first and second subcarrier components including in combination, means including a first network for deriving the chroma subcarrier wave, means including a second network for producing first and second exciting signals having the frequency of the subcarrier wave and differing in phase by said predetermined amount, first and second unilaterally conducting devices each having an anode electrode, a control electrode and a cathode electrode, said first network including circuit means connected to said control electrodes of said first and second devices for applying the chroma subcarrier wave thereto, said second network applying said first and second exciting signals to said cathode electrodes of said first and second devices respectively, means whereby a composite signal is developed in each device corresponding to the sum of the chroma subcarrier wave and the exciting signal applied thereto with the exciting signal having an effective amplitude at least double that of the subcarrier wave, said circuit means including means for biasing each of said devices to a half-wave rectifying condition for said composite signal, and output circuit means including portions coupled to said anode electrodes of said devices for deriving therefrom first and second signals having alternating current components corresponding to the modulation of said first and second subcarrier components.

18. In a color television receiver for utilizing a color television signal having at least one color sub-carrier component amplitude modulated in accordance with chroma information, the combination of means including a first network for deriving the color sub-carrier components, means including a second network for producing an exciting signal having the phase and frequency of the sub-carrier component, a three element electron amplifying device having a pair of input electrodes and an output electrode, means connecting said first and second networks individually to said input electrodes of said device to apply said sub-carrier component and said exciting signal thereto, means including said networks whereby said device produces a composite signal corresponding to the sum of the modulated sub-carrier component and the exciting signal and with the exciting signal having an effective amplitude at least double that of the sub-carrier component, self-biasing means coupled to one of said input electrodes for biasing said device to a condition of half-wave rectification for said composite signal, and an output circuit coupled to said output electrode of said device for deriving a signal having an alternating-current component corresponding to the modulation of the sub-carrier component.

19. In a color television receiver for utilizing a color television signal having at least one color sub-carrier component amplitude modulated in accordance with chroma information, the combination including, first means for deriving the color sub-carrier component from the received television signal, second means for producing an exciting signal having the frequency and phase of the sub-carrier component, an electron device having three electrodes including first and second control electrodes, means for coupling said first control electrode to said first means, means for coupling said second control electrode to said second means, means whereby the exciting signal has an effective amplitude in said electron device at least double that of the sub-carrier component, an output circuit coupled to said electron device including means for supplying energizing potential to said device, and self-biasing means for biasing said device to a point whereby said device functions as a half-wave rectifier for the exciting signal and the sub-carrier component, whereby said output circuit derives a signal having an alternating current component corresponding to the modulation of the sub-carrier component.

20. In a color television receiver for utilizing a color television signal having at least one color sub-carrier component amplitude modulated in accordance with chroma information, the combination including, first means for deriving the color sub-carrier component from the received television signal, second means for producing an exciting signal having the frequency and phase of the sub-carrier component, an electron device having three electrodes including first and second control electrodes, input circuit means for coupling said first control electrode to said first means and for coupling said second control electrode to said second means, said input circuit means applying the exciting signal and the sub-carrier component to said electron device so that the exciting signal has an effective amplitude in said device at least double that of the sub-carrier component, and output circuit means coupled to said device including means for supplying energizing potential to said device, said circuit means biasing said device to a point such that said device functions as a half-wave rectifier for the exciting signal and sub-carrier, whereby said output circuit derives a signal having an alternating current component corresponding to the modulation of the sub-carrier component.

References Cited in the file of this patent

UNITED STATES PATENTS

| | | |
|---|---|---|
| 2,318,197 | Clark | May 4, 1943 |
| 2,718,546 | Schlesinger | Sept. 20, 1955 |
| 2,858,428 | Torre | Oct. 28, 1958 |